United States Patent [19]
Petersen

[11] Patent Number: 4,959,830
[45] Date of Patent: Sep. 25, 1990

[54] METHOD AND APPARATUS FOR THROUGH-CONNECTING A WIDEBAND CONNECTION IN A DIGITAL TIME SWITCH

[75] Inventor: Lars-Göran Petersen, Tumba, Sweden

[73] Assignee: Telefonaktiebolaget L M. Ericsson, Stockholm, Sweden

[21] Appl. No.: 365,769

[22] Filed: Jun. 14, 1989

[30] Foreign Application Priority Data

Jul. 12, 1988 [SE] Sweden .................. 8802605

[51] Int. Cl.⁵ .................. H04J 3/06; H04L 7/00
[52] U.S. Cl. .................. 370/108; 375/118
[58] Field of Search .................. 370/68, 66, 99, 58.1, 370/108; 375/118

[56] References Cited

U.S. PATENT DOCUMENTS

| | | | |
|---|---|---|---|
| 3,632,883 | 1/1972 | Aagaard | 370/66 |
| 3,890,469 | 5/1975 | Kelly et al. | 179/15 AT |
| 4,009,349 | 2/1977 | Belforte et al. | 370/66 |
| 4,012,598 | 3/1977 | Wiley | 375/118 |
| 4,181,975 | 1/1980 | Jenkins | 375/118 |
| 4,345,273 | 8/1982 | Barabas et al. | 370/58.1 |
| 4,392,234 | 7/1983 | Maruta | 375/118 |
| 4,412,324 | 10/1983 | Glowinsky et al. | 370/58.1 |

FOREIGN PATENT DOCUMENTS

| | | |
|---|---|---|
| 0119843 | 9/1984 | . |
| 0093740 | 5/1986 | Japan .................. 370/66 |
| 8503112-8 | 8/1987 | Sweden . |
| 2074420 | 10/1981 | United Kingdom . |

Primary Examiner—Douglas W. Olms
Assistant Examiner—Alpus H. Hsu
Attorney, Agent, or Firm—Burns, Doane, Swecker & Mathis

[57] ABSTRACT

The present invention relates to a method and apparatus for through-connecting in a digital time switch a wideband connection including two or more channels. Each of the channels utilizes a specific time slot in each frame coming into the switch, and a specific time slot in each frame departing from the switch. The problem solved by the invention is that the contents in certain outgoing time slots are delayed by one frame, whereas the contents in other outgoing time slots (so-called undelayed slots) are not delayed, which causes the information sequence in outgoing slots to be mixed up in relation to the information sequence in corresponding incoming slots, whereby the transmitted information is distorted. The method solving this problem is that the content in delayed slots is read out from a speech store, the contents of which are in phase with the contents in an incoming frame, while the contents in undelayed slots is read out from an extra speech store, the contents of which are delayed one frame in relation to the contents in the incoming frame. The contents in undelayed times slots are thus delayed by one frame so that the contents in all time slots departing from the wideband connection are delayed by one frame, resulting in the information being connected through the switch without being distorted.

2 Claims, 2 Drawing Sheets

METHOD AND APPARATUS FOR THROUGH-CONNECTING A WIDEBAND CONNECTION IN A DIGITAL TIME SWITCH

TECHNICAL FIELD

The present invention is in the field of telephony equipment operating with pulse code modulation (PCM) and multiplexing. The invention relates to a method and apparatus for through-connecting in a digital time switch a wideband connection including two or more channels.

BACKGROUND ART

A wideband connection utilises two or more channels for information transmission. Each of the channels uses a specific time slot (hereinafter referred to as "slot") in each frame coming to the switch and a specific slot in each frame departing from the switch for the information transmission. As far as the time switch is concerned, incoming frames contain a given number of numerically ordered slots, and outgoing frames contain the same number of slots. When slots are through-connected in a digital time switch, the content in incoming slots is switched to other outgoing slots corresponding to the incoming slots. This is performed by the content in slots coming to the switch, arranged in successive frames, are written sequentially into a speech store simultaneously as outgoing slots are read out sequentially from the speech store, and a control store determines from what address in the speech store the content of outgoing slots shall be read out. The speech store has room for the contents of time slots in a frame. When the speech store is filled with the contents in the time slots in a first frame, the contents in a subsequent frame is written in, the information from the first frame being written over. The system is synchronised so that the information in slot number one in an incoming frame is written into the speech store during the same clock pulse period as the slot number one in an outgoing frame is read out. In through-connecting a wideband connection, it may occur that the content in some, but not all, of the outgoing slots is delayed one frame, which causes the information sequence in outgoing slots to be jumbled in relation to the information sequence in corresponding incoming slots, thus causing the transmitted information to be distorted.

An apparatus for solving this problem is to be found in the Swedish patent application SE 8503112-8. The invention according to this publication signifies that the possible delay between the contents of the channels is smoothed out after switching-through in the digital time switch.

DISCLOSURE OF INVENTION

According to the mentioned Swedish patent application, the technical problem of the contents in some of the slots in the wideband connection being delayed has been solved by an apparatus placed outside the digital time switch.

The present invention, which is characterized by the claims, provides another solution to the mentioned problem, this solution being applied in the digital time switch.

The method of solving the mentioned problem involves that the ordinal numbers of incoming slots in the wideband connection are compared with the ordinal numbers of corresponding outgoing slots, a processor calculating which outgoing slots will contain information which is delayed one frame i.e. delayed slots and which outgoing slots will contain information which is in phase with the information in incoming frames, i.e. so-called undelayed slots. For each outgoing slot it is indicated in a control store with the aid of a marking bit whether the slot is delayed or undelayed, on read out the contents in delayed slots are read from a speech store, the contents of which are in phase with the contents in incoming frames, and the contents in undelayed slots are read out from an extra speech store, the contents of which are delayed one frame in relation to the contents in incoming frames. By this method, the contents in all outgoing slots in the wide band connection will be delayed one frame in relation to the contents in incoming frames, so that the information in the slots of the wideband connection is delivered from the digital switch in the same order as the information arriving at the switch.

An apparatus for carrying out the method includes a first speech store in which the contents in incoming slots are written in sequentially, a control store in which information is stored as to what incoming and outgoing slots correspond to each other, and an extra speech store, the contents of which are delayed one frame in relation to the contents in the mentioned first speech store. In addition, the control store contains information on each outgoing slot as to whether it is delayed our undelayed, the contents in delayed outgoing slots being taken from the first speech store while the contents in undelayed time slots are taken from the extra speech store, so that outgoing slots contain information in the same order as incoming slots.

BRIEF DESCRIPTION OF DRAWINGS

The method and apparatus in accordance with the invention will now be described in more detail below, with the aid of an embodiment and with reference to the accompanying drawing, where.

BEST MODE FOR CARRYING OUT THE INVENTION

The method and apparatus in accordance with the invention are intended for through-connection of a wideband connection in a digital time switch, e.g. one included in a telephone exchange.

Figure 1:
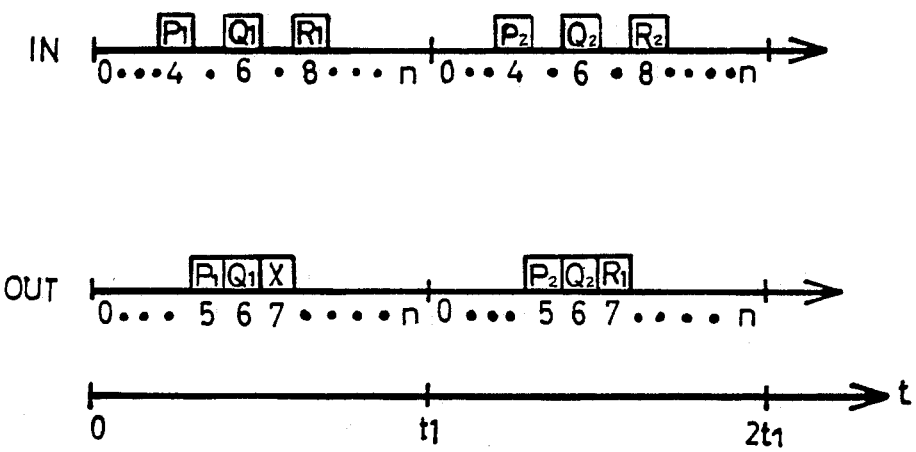
FIG. 1 illustrates the problem of how the information sequency in outgoing slots is mixed up in relation to the information sequence in corresponding incoming slots.

FIG. 1 illustrates incoming slots IN to a digital time switch (not shown in the Figure) and simultaneously outgoing slots OUT from the same time switch. Each frame contains n slots, and for the wideband connection in accordance with the example, three of these are used. The wideband connection has been alloted slots with the ordinal numbers 4, 6 and 8 in incoming frames and slots with the ordinal numbers 5, 6, and 7 in outgoing frames. The content in an incoming slot with the ordinal number 4 is to be switched to an outgoing slot with the ordinal number 5 and so on. In the Figure the slots of the wideband connection in two successive frames are illustrated. The contents in the slots arrives in turn to the digital time switch, the contents in the first frame during the time $t_1$ and in the second frame between the times $t_1$ and $2t_1$. Incoming slots in the first frame of the wideband connection contain the information $P_1$, $Q_1$ and $R_1$ and in the second frame the information $P_2$, $Q_2$ and $R_2$. The information arrives at the switch in this order, which is the order of logical context. Writing in the contents in incoming slots takes place in a speech store and readout takes place from the same store. The readout from the mentioned speech store during outgoing slots is controlled by a control store, the contents in incoming slots being switched to outgoing slots corresponding to incoming slots. Writing-in takes place during the same clock pulse as reading out, the content in an incoming slot, e.g. number 4 in the first frame, is written in during the first part of the clock pulse (writing phase) and the outgoing slot 4 in the first frame is read during the second part of the clock pulse (reading phase). The speech store has room for the slots in one frame and when the store is filled, the information is written over by the contents in subsequent frame slots.

The contents in some of the outgoing slots of the connection, so-called delayed slots, are read out delayed by one frame, while the contents in the remaining outgoing slots, so-called undelayed slots, are read out in phase with the incoming frame. The outgoing slots which are delayed are those with ordinal numbers greater than, or equal to, the ordinal numbers of corresponding incoming slot. This applies to outgoing slots 5 and 6 in the example. The contents $P_1$, $Q_1$, $P_2$, $Q_2$ in these are read out in the same order and during the same frame time as they are written in. Delayed time slots are the outgoing ones with ordinal numbers less than the ordinal numbers of corresponding incoming slots. This applies to slot number 7 in the example, its number being lower than number 8, which is the number of the corresponding incoming slot. The content X in the outgoing slot number 7 in the first frame comes from a previously arriving frame (not illustrated in the Figure) and the content $R_1$ in the outgoing slot number 7 in the second frame comes from the first incoming frame. This delay is due to that the outgoing slot number 7 is read out before the corresponding incoming slot number 8 in the same frame has been written in. In the example, the contents in incoming slots IN have the order sequence: $P_1$, $Q_1$, $R_1$, $P_2$, $Q_2$, $R_2$ whereas the contents in the outgoing slots OUT obtain the order sequence: $P_1$, $Q_1$, X, $P_2$, $Q_2$ $R_1$, which signifies that the information no longer has logical context after being through-connected.

This technical problem is thus caused by the wideband connection using both undelayed and delayed outgoing slots. The method and apparatus solving the mentioned problem involves that the contents in undelayed slots are delayed one frame so that the contents of all slots is delayed one frame, thus retaining the order sequence of the content in the slots as they are through-connected.

Figure 2:
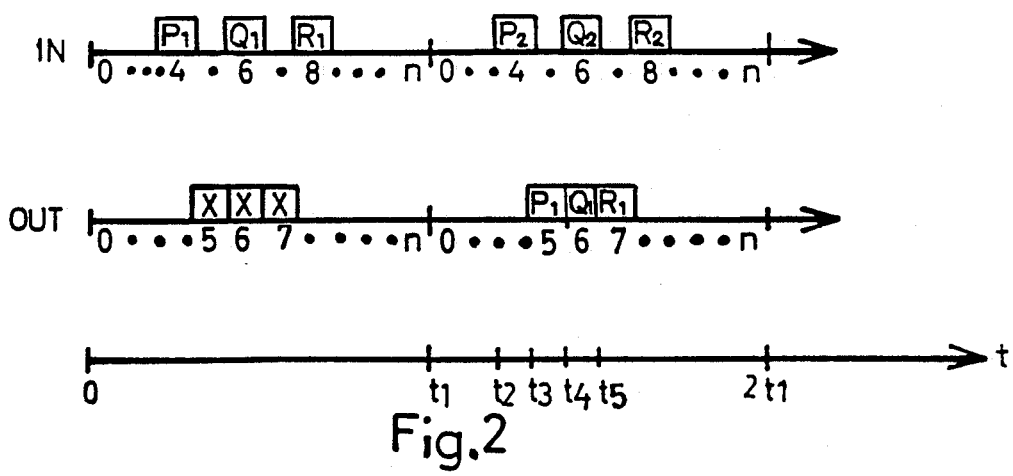
FIG. 2 illustrates how the information sequency in outgoing slots is the same as in corresponding incoming slots in a digital time switch in accordance with the invention and FIG. 3 illlustrates an apparatus in accordance with the invention implemented in a digital time switch.

FIG. 2 illustrates how the order of the content in incoming slots IN is retained at through-connection in a digital time switch in accordance with the invention. The Figure also shows how the through-connected information is delayed one frame. The information $P_1$, $Q_1$, $R_1$ in the incoming first frame is read out in logical order in the outgoing second frame.

Figure 3:
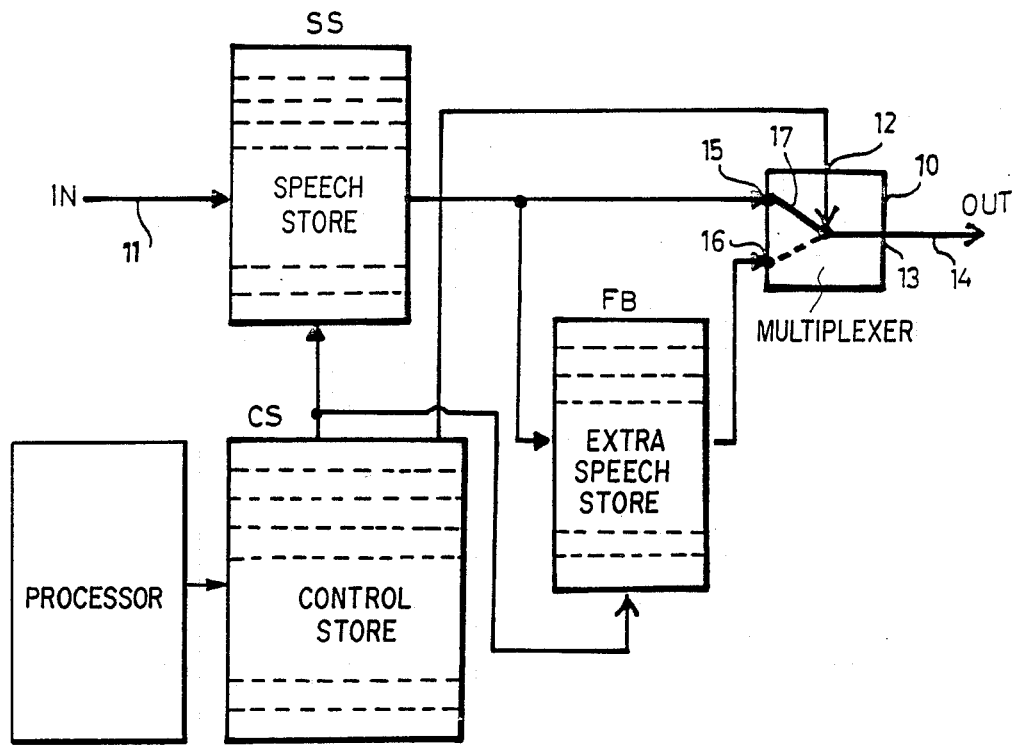

The method and apparatus in accordance with the invention will now be described with reference to FIGS. 2 and 3. FIG. 3 illustrates an apparatus in accordance with the invention, the apparatus is included in a digital time switch. The apparatus includes a first speech store SS, an extra speech store FB, a control store CS and a multiplexer 10. A bus 11 is connected to the speech store SS for delivering incoming slots IN to the switch. The speech store SS includes equally as many storage cells as slots in a frame, n cells according to the example. Each cell has an address corresponding to the ordinal number of a slot. Incoming slots IN are written sequentially into the speech store SS. Between the time 0 and time $t_1$ the contents in a first frame of incoming time slots are written into the speech store and between the time $t_1$ and $2t_1$ the contents in a second frame of incoming time slots are written into the speech store, the contents of the first frame being written over. The speech store SS is connected to the extra speech store FB so that the contents $P_1$, $Q_1$, $R_1$ in the first incoming frame of the wideband connection will be written into said extra speech store before the contents $P_2$, $Q_2$, $R_2$ in the second incoming frame are written into the speech store. The extra speech store FB contains equally as many storage cells as slots in a frame, and each cell has an address corresponding to the ordinal number of a slot. During a clock pulse, e.g. between the time $t_2$ and $t_3$ the following takes place, e.g. when the information from the incoming slot number 4 written into the speech store SS is to be read out and written into the extra speech store FB. The content $P_1$ which is stored at the address 4 in the speech store SS is read out from it and written into the extra speech store FB at the address 4, after which the content $P_2$ in slot number 4 in the next following incoming frame is written into the speech store SS. The extra speech store FB thus contains information which is delayed one frame in relation to the content in the speech store SS. By delayed information from said extra speech store FB being read out during undelayed slots and by the information from said speech store SS being read out during delayed slots, the contents in all the outgoing slots of the wideband connection are delayed one frame on through-connection in the switch, whereby the order of the contents in the through-connected slots is retained.

The control store CS controls the through-connection of slots and contains just as many memory cells as slots in a frame. Each memory cell has an address corresponding to the ordinal number of an outgoing time slot, and contains information as to from what store SS, FB and from what address in the respective store information shall be read out during the outgoing slot. A memory cell in the control store CS relating to an outgoing slot contains in a first part the address to the memory cell in the speech stores SS, FB in which the content in the corresponding incoming slot is written, so that during the outgoing slot the information written into the stores during the corresponding incoming slot is read out. The storage cell in the control store contains in a second part a bit which indicates whether the slot is of the undelayed or delayed type, so that information during the outgoing slot is read out from the speech store SS if the slot is delayed, and from the extra speech store FB if the slot is undelayed. A processor (unillustrated in the Figure) compares the ordinal number of each outgoing slot in the wideband connection with the ordinal number of the corresponding incoming slot. For an outgoing slot (an undelayed slot) with an ordinal number greater than or equal to, the ordinal number of a corresponding incoming slot a first indication, e.g. a binary one, is made in said second part of the memory cell of the outgoing slot in the contol store CS, this first indication denoting that information during the outgoing slot is to be read out from the extra speech store FB. According to the example, a first indication is made in the memory cells for the outgoing slots 5 and 6. For an outgoing slot (a delayed slot) with an ordinal number less than the ordinal number of a corresponding incoming slot, a second indication, e.g. a bindary 0, is made in said second part of the memory cell of the outgoing slot, this second indication denoting that the information during the outgoing slot is to be read out from the speech store SS. According to the example, this second indication is made for the outgoing slot number 7. The control store CS is connected to both speech stores SS, FB such that for each outgoing slot it gives the address which the corresponding incoming slot has in the speech stores. The control store CS is also connected to a control input 12 on the multiplexer 10, which has an output 13 connected to a bus 14 for outgoing slots OUT and two inputs 15, 16, the first input 15 being connected to the speech store SS and the second input 16 being connected to the extra speech store FB. The multiplexer 10 contains a switch 17 connecting the bus 14 to either of the speech stores SS, FB depending on the indications in the control store CS.

Read out of information during the outgoing slots of the wideband connection takes place in the following manner. See FIG. 2, slots 5, 6 and 7 in the second frame. At the time $t_3$, the content $P_1$ is placed in the extra speech store FB and the content $P_2$ is placed in the speech store SS according to the description already provided. On reading out information during slot number 5, said first indication i the control store CS actuates the switch 17 so that it connects the bus 14 to said extra speech store FB, from which the information $P_1$ is pointed out on the address 4, and is read out during the outgoing slot number 5. Between the time $t_4$ and $t_5$ the content $Q_1$, which is stored in the memory cell 6 of the speech store SS, is written into the extra speech store FB, the content $Q_2$ in slot 6 in the incoming second frame is written into the speech store SS, and the content $Q_1$ in the outgoing slot number 6 is read out from the extra speech store FB, since this outgoing slot has said first indication in the control store. On reading out the slot number 7, the second indication in the control store actuates the switch 17 so that it connects the bus 14 to the speech store SS, from which the content $R_1$ is read out during the outgoing slot number 7.

By the reading out taking place in this way from either of the stores SS, FB, depending on the indication for the outgoing time slot in the control store CS, the contents in the outgoing slots OUT obtain the same order as the contents in the incoming slots IN, which means that the information is through-connected in the switch without being distorted.

I claim:

1. Method of connecting a wideband connection comprising at least two channels through a digital time switch, incoming time slots arranged in successive frames being written in sequentially in said time switch, from which outgoing slots are read out sequentially, the content in incoming slots being switched to outgoing slots corresponding to said incoming slots, this switching being controlled from a control store, characterized in that the content in incoming slots is written frame by frame into a speech store and after the content in a first frame of slots is written in, the content in the slots in the subsequent frame is written into said speech store, whereby the content in the first frame is read out from the speech store and written into an extra speech store, the content of which is thus delayed one frame in relation to the content in the speech store, and that for each of the outgoing slots of the wideband connection, their ordinal numbers are compared in a processor with the ordinal number of a corresponding incoming slot, and for an outgoing slot which is an undelayed slot with an ordinal number which is greater than or equal to the ordinal of the corresponding incoming slot a first indication is made in said control store, and for an outgoing slot which is a delayed slot with an ordinal number which is less than the ordinal number of a corresponding incoming slot a second indication in said control store is made, and in that each outgoing time slot in the wideband connection has its indication in the control store read out, the content during an outgoing slot being read out from said extra speech store if the slot has said first indication, and from said speech store if the slot has said second indication, the contents in the outgoing undelayed slots of the wideband communication being delayed one frame in relation to the contents in the slots in an incoming frame, so that the contents in all outgoing slots of the wideband connection are delayed one frame, whereby the contents in the outgoing time slot are given the same order as the contents in corresponding incoming slots.

2. Apparatus for through-connecting in a digital time switch a wideband connection comprising at least two channels, to which time switch incoming slots arrange in sequential frames are written in sequentially, and from which time switch outgoing slots are read out sequentially, the contents in incoming slots being switched to outgoing slots corresponding to said incoming slots, said switching being controlled from a control store, characterized in that said digital time switch includes a first speech store in which the contents in incoming slots are written in frame by frame, the content in each of the slots being placed in its individual storage cell with an address corresponding to the ordinal number of the slot, and in that said speech store is connected to an extra speech store including storage cells with addresses corresponding to the ordinal numbers of time slots in a frame, said extra store storing incoming time slots with a delay of one frame, and in that said control store includes storage cells with addresses corresponding to the ordinal numbers of outgoing slots, said cells in said control store in a first part contains the address of the corresponding incoming slot in both speech stores, and in a second part contains a first or a second indication, and in that said control store is connected to both speech stores for being able to indicate from which address the content shall be read out during an outgoing time slot, and in that said control store is connected to a control input on a multiplexer having a first input connected to said speech store, and a second input connected to said extra speech store, said multiplexer having an input connected to a bus for outgoing slots and for each such slot switching said bus to either of the speech stores in response to the indication of the outgoing slot in the control store.

* * * * *